United States Patent
Togami et al.

(10) Patent No.: US 7,264,408 B2
(45) Date of Patent: *Sep. 4, 2007

(54) MODULAR OPTICAL DEVICE PACKAGE

(75) Inventors: Chris K. Togami, San Jose, CA (US); Gary Sasser, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/116,693

(22) Filed: Apr. 27, 2005

(65) Prior Publication Data

US 2005/0244110 A1    Nov. 3, 2005

Related U.S. Application Data

(60) Provisional application No. 60/566,039, filed on Apr. 28, 2004.

(51) Int. Cl.
*G02B 6/36* (2006.01)
(52) U.S. Cl. .............................. 385/92; 385/53; 385/88

(58) Field of Classification Search ................. 385/53, 385/88, 92
See application file for complete search history.

(56) References Cited

U.S. PATENT DOCUMENTS 6,913,400 B2 * 7/2005 O'Toole et al. ............... 385/89
2005/0105915 A1 * 5/2005 Light ........................ 398/164

* cited by examiner

*Primary Examiner*—Jennifer Doan
(74) *Attorney, Agent, or Firm*—Workman Nydegger

(57) ABSTRACT

Embodiments of the present invention are directed to a modular optical device for sending and/or receiving optical signals. A lens block is configured to mechanically couple to one or more lens pins and to a molded package. A molded package, including at least one of a light source and a light detector and including a connection portion manufactured for direct mechanical and electrical coupling of the molded package to a substrate, is mechanically coupled to the lens block. At least one lens pin for directing an optical signal between a light source or light detector and corresponding external components is coupled to the lens block. The modular optical device can be coupled to a substrate configured to be received within a standard slot of a host system, such as a PCI or PCMCIA slot. Thus, one or more optical connections are integrated within the host device or system.

23 Claims, 7 Drawing Sheets

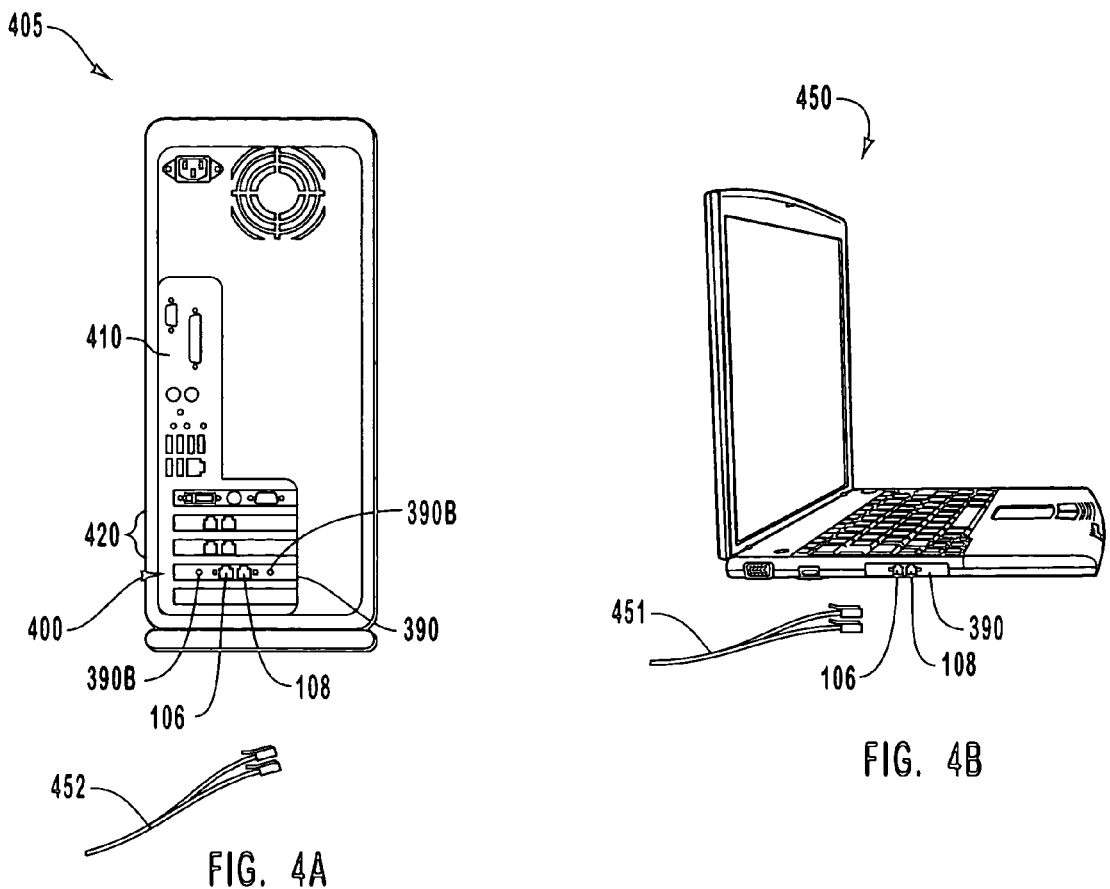
FIG. 4A
FIG. 4B
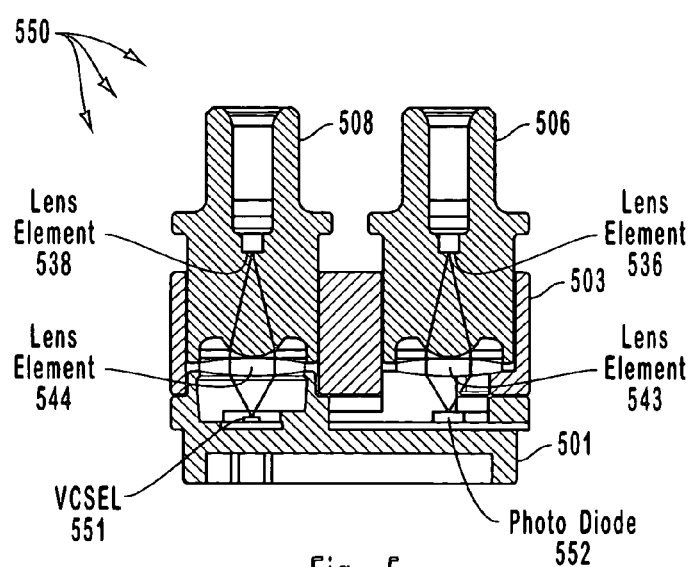
Fig. 5

MODULAR OPTICAL DEVICE PACKAGE

CROSS-REFERENCE TO RELATED APPLICATIONS

The present invention claims priority to U.S. Provisional Patent Application Ser. No. 60/566,039, entitled "Modular Optical Device Package", filed on Apr. 28, 2004, the entire contents of which are incorporated herein by reference.

BACKGROUND OF THE INVENTION

1. The Field of the Invention

The present invention is generally related to optical devices used in fiber optic communications systems. More particularly, the present invention provides for compact low cost modular optical devices.

2. The Relevant Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. Generally, such optical transceivers implement both data signal transmission and reception capabilities. For example, a transmitter portion of a transceiver is configured to convert an incoming electrical data signal into an optical data signal and a receiver portion of the transceiver is configured to convert an incoming optical data signal into an electrical data signal.

More particularly, an optical transceiver at the transmission node receives an electrical data signal from a network device, such as a computer, and converts the electrical data signal to a modulated optical data signal using an optical transmitter such as a laser. The optical data signal can then be transmitted in a fiber optic cable via the optical communications network to a reception node of the network. At the reception node, the optical data signal is received at another optical transceiver that uses a photodetector, such as a photodiode, to convert the received optical data signal back into an electrical data signal. The electrical data signal is then forwarded to a host device, such as a computer, for processing.

Generally, multiple components are designed to accomplish different aspects of these functions. For example, an optical transceiver can include one or more optical subassemblies ("OSA") such as a transmit optical subassembly ("TOSA"), and a receive optical subassembly ("ROSA"). Typically, each OSA is created as a separate physical entity, such as a hermetically sealed cylinder that includes one or more optical sending or receiving components, as well as electrical circuitry for handling and converting between optical and electrical signals. Within the optical transceiver, each OSA generally includes electrical connections to various additional components such as a transceiver substrate, sometimes embodied in the form of a printed circuit board ("PCB"). OSAs in a conventional transceiver are generally oriented such that a longitudinal axis defined by the OSA is substantially parallel to the transceiver substrate. The transceiver substrate, in turn, is mounted to the board of a host bus adapter ("HBA") or other component.

The transceiver substrate can include multiple other active circuitry components particularly designed to drive or handle electrical signals sent to or returning from one or more of the OSAs. Accordingly, such a transceiver substrate will usually include a number of electrical transmission lines with the one or more OSAs. Such connections may include "send" and "receive" data transmission lines for each OSA, one or more power transmission lines for each OSA, and one or more diagnostic data transmission lines for each OSA. These transmission lines are connected between the transceiver substrate and the OSA using different types of electrical connectors, examples of which include an electrical flex circuit, a direct mounting connection between conductive metallic pins extending from the OSA and solder points on the PCB, and a plug connection that extends from the PCB and mounts into electrical extensions from an OSA.

As part of ongoing efforts to uniformly reduce the size of optical transceivers and other components, manufacturing standards such as the small form factor ("SFF"), small form factor pluggable ("SFP"), and 10 gigabit small form factor pluggable ("XFP") standards have been developed. Nonetheless, the size of most optical transceivers, even those that comply with such manufacturing standards, best suits them for external connections to a computer system, such as a desktop computer, a laptop computer, or a handheld digital device.

For example, an SFF or SFP optical transceiver can be used to provide an interface between an optical cable and a standard network cable, such as an Ethernet cable for example, that plugs into a computer system. Alternatively, a number of optical transceivers can be mounted in a network panel and configured to include an external connection to a computer system. However, the number of components within a conventional transceiver, as well as the orientation and the size of SFF or SFP optical transceivers, makes it difficult, if not impossible, to integrate conventional optical transceivers into smaller spaces, such as within a pluggable card for use in a laptop computer or hand held device. For example, despite their relatively compact nature, conventional SFF, SFP, and XFP optical transceiver bodies are still too wide and/or tall to fit within a typical PCMCIA laptop envelope.

A related problem concerns the connections of the optical transceiver. In particular, use of the optical transceiver as an external, rather than internal, component necessitates the use of additional connectors and connections, which increase both the overall cost associated with the system as well as the complexity of the system. As well, optical transceivers employed in an external, rather than integrated, configuration are more prone to rough handling and damage than an integrated component.

Furthermore, even if the conventional optical transceiver could fit within such an envelope, the length of the conventional optical transceiver SFF, SFP, or XFP optical transceiver is such that the transceiver substrate takes up an inordinate amount of board space on a corresponding host bus adapter ("HBA") or other component to which the optical transceiver is attached. This problem is of particular concern in light of the concurrent demands for increases in functionality and decreases in component size. These, and other, considerations make conventional optical transceivers less than ideal for integration within many computer systems. Accordingly, what would be advantageous are reduced cost optical transceivers that can fit within relatively small envelopes such that the optical transceiver can be integrated within compact components and various computing systems and devices.

BRIEF SUMMARY OF THE INVENTION

The foregoing problems with the prior state of the art are overcome by the principles of the present invention, which are directed to modular optical devices. A lens block is configured to mechanically couple to one or more lens pins and to a molded package. A molded package, including at least one of a light source and a light detector and including a connection portion for mechanically and electrically coupling the molded package to a substrate, is mechanically coupled to the lens block. At least one lens pin for directing an optical signal between a light source or light detector and corresponding external components is coupled to the lens block. The modular optical device can be coupled to a substrate configured to be received within a standard slot of a host device or system, such as a PCI or PCMCIA slot. Thus, one or more optical connections may be integrated within the host device or system.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates a rear view of a desktop computer system having a host bus adaptor that includes a modular optical device.

FIG. 4B is a side view of a laptop computer system having a host bus adapter that includes a modular optical device.

FIG. 5 illustrates an example of a cross sectional view of an assembled modular optical device including lens elements.

DETAILED DESCRIPTION OF THE PREFERRED EMBODIMENTS

Figure 1A:
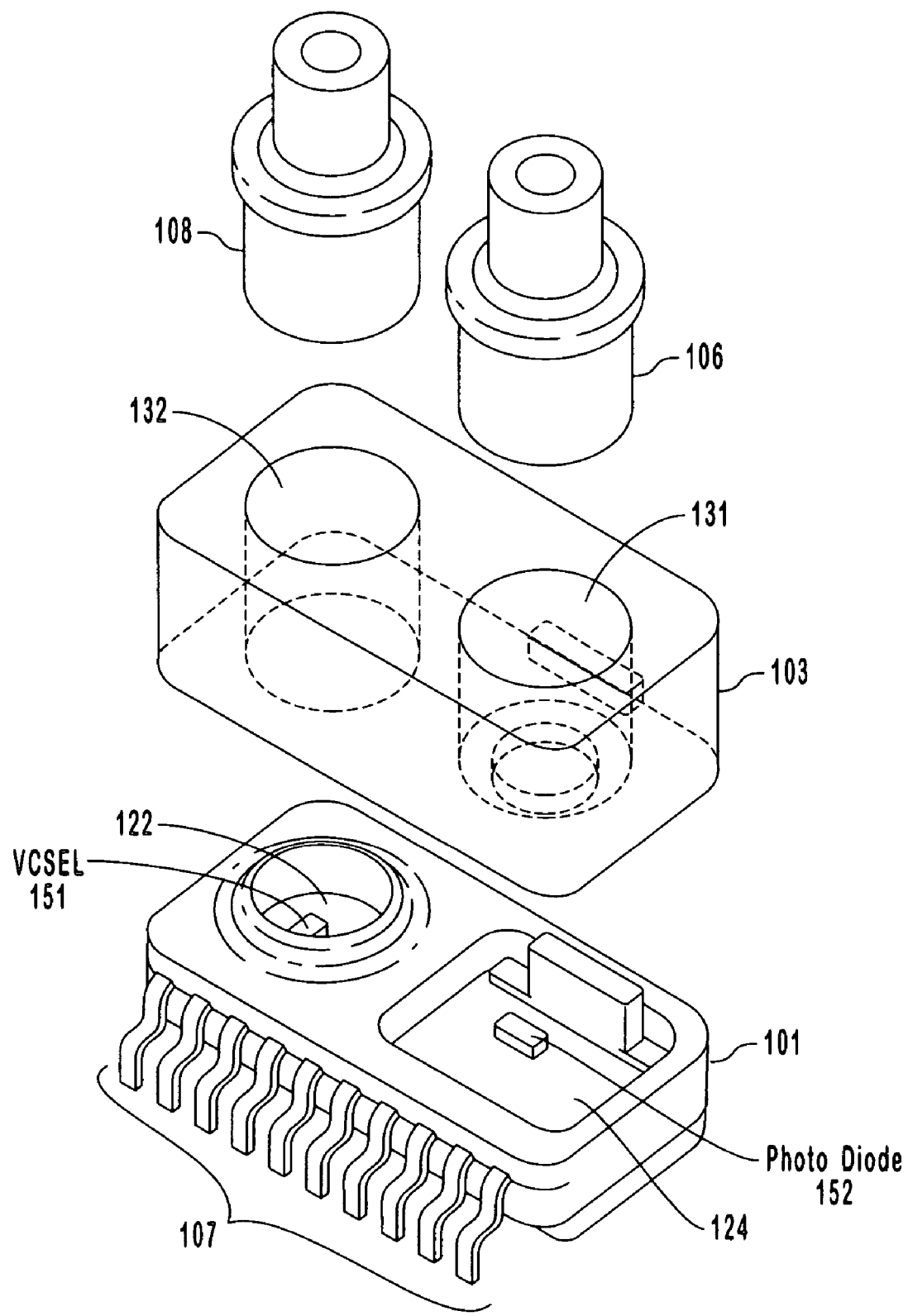
FIG. 1A illustrates components of an example modular optical device.

The principles of the present invention relate to modular optical devices. In general, embodiments of the present invention describe modular optical devices (e.g., TOSAs and ROSAs) that can be integrated within the relatively small physical envelopes defined by compact components, such as a Host Bus Adapter ("HBA"). Embodiments of the present invention can interoperate with a desktop computer, a laptop computer, or other similar computer system, while maintaining compliance with applicable operational and performance standards.

As used herein, "OSA" refers to any one of a transmit optical subassembly ("TOSA") or a receive optical subassembly ("ROSA"). Further, a "substrate" refers to a printed circuit board ("PCB") having electrically conductive elements such as circuit traces for transmitting power and/or communication signals between components on a modular optical device and another system or device, such as a computer system. A transceiver PCB (e.g., a Host Bus Adapter) can include circuits, devices and systems for facilitating the operation and control of the modular optical device. Such circuits, devices and systems include, but are not limited to, a laser driver, a post amplifier, and transimpedance amplifier.

Embodiments of the present invention include a lens block that is configured such that one or more lens pins can mechanically couple to the lens block and such that the lens block can mechanically couple to a molded package. Accordingly, a modular optical device can include a lens block, a molded package, and one or more lens pins.

The molded package can include a light source (e.g., a laser) and/or light detector (e.g., photodiode) within openings for transmitting and receiving optical signals. The molded package can also include a thru hole pin configuration or lead frame (e.g., a formed lead frame) for connecting (e.g., surface mounting) or a flex circuit for connecting the molded package to a Printed Circuit Board Assembly ("PCBA"), such as, for example, a Host Bus Adapter ("HBA"). Thus, active and/or passive circuitry components for driving the light source (e.g., a laser driver) for converting a received light signal (e.g., transimpedance amplifier), or for implementing other optical signal processing can be designed into the PCBA. Advantageously, the cost of a modular optical device can be reduced and the modular optical device need not include functionality that may be redundant with the functionality of the PCBA.

Configurations of the lens block can include receptacles from receiving one or more lens pins. For example, a transmission lens pin, a reception lens pin, or a combination of transmission lens pins and/or reception lens pins can be mechanically coupled to the lens block. Lens pins mechanically coupled to the lens block can provide appropriate receptacles for receiving external optical connections.

Accordingly, a lens pin can direct a generated optical signal from the lens block to an external component (e.g., an optical cable) or can direct a received optical signal from an external component to the lens block. For example, an optical signal generated at a laser in the molded package can be transferred through a corresponding lens in the lens block, transferred through a corresponding lens pin, to a corresponding optical cable. Likewise, an optical signal received from an optical cable can be transferred through a corresponding lens pin, transferred through a corresponding lens in the lens block, into a corresponding photodiode in the molded package.

Referring now to FIG. 1A, FIG. 1A illustrates components of an example modular optical device. Generally, components similar to those in FIG. 1 can be used in modular optical devices of various form factors, including, but not limited to, an SFF, SFP, and XFP optical transceiver. The foregoing are exemplary however, and modular optical devices can be implemented in various other forms as well. Further, embodiments of the invention are suitable for use in connection with a variety of data rates such as about 1 Gbps, about 2 Gbps, about 4 Gbps, and about 10 Gbps, or higher.

FIG. 1A depicts lens pins 106 and 108, lens block 103, and molded package 101. Lens block 103 can be a molded plastic part with locations for one or more lens elements. As depicted, lens block 103 is configured as a TX/RX lens block. That is, lens block 103 includes receptacle 132 for mechanically coupling to a transmission lens pin and receptacle 131 for mechanically coupling to a reception lens pin. Accordingly, lens block 103 facilitates both transmitting and receiving an optical signal.

However, lens block 103 or a similar lens block can be configured differently than depicted in FIG. 1A. In some embodiments, lens block 103 or a similar lens block is configured as a separate lens block with reduced functionality. For example, lens block 103 or a similar lens block can be configured as a separate TX lens block for transmitting an optical signal or can be configured as a separate RX lens block for receiving an optical signal. In these embodiments, lens block 103 or a similar lens block can mechanically couple to a lens pin that facilitates the desired functionality (e.g., either transmitting an optical signal or receiving an optical signal).

In other embodiments, lens block 103 or a similar lens block is configured as a combination lens block with different combinations of functionality. For example, lens block 103 or a similar lens block can be configured to transmit a plurality of optical signals and/or receive a plurality of optical signals. Accordingly, lens block 103 or a similar lens block can include a plurality of receptacles for mechanically coupling to transmission lens pins and a corresponding plurality of receptacles for mechanically coupling to reception lens pins. Further, lens block 103 or a similar lens block can be configured as an unbalanced combination lens block. That is, the number of receptacles for mechanically coupling to transmission lens pins and the number of receptacles for mechanically coupling to reception lens can differ.

A lens block may or may not include lens elements. For example, in some embodiments, lens elements are included in one or more of receptacles 131 and 132 and/or in one or more other appropriate receptacles based on lens block configuration. In other embodiments, no receptacles include lens elements.

Molded package 101 includes transmission opening 122 for transmitting generated optical signals. For example, VCSEL 151 (Vertical Cavity Surface Emitting Laser) can transmit optical signals out of transmission opening 122. Molded package 101 also includes detector opening 124 for detecting received optical signals. For example, photodiode 152 can detect optical signals received at detector opening 124. Molded package 101 also includes a formed lead frame 107 for connecting molded package 101 (both electrically and mechanically) to a Printed Circuit Board Assembly ("PCBA"), such as, for example, a Host Bus Adapter ("HBA"). For example, formed lead frame 107 can be used to surface mount molded package 101 to a PCBA. Thus, formed lead frame 107 can be manufactured for direct connection to a PCBA without having to perform further (potentially manual) processing on formed lead frame 107.

In some embodiments, a corrosive resistant coating is used to protect components, such as, for example, VCSEL 151 and photodiode 152, in molded package 101. For example, a diluted silicone mixture can be used to coat the components of molded package 101.

Lens pins 106 and 108 can be slip fit into receptacles 131 and 132 respectively to facilitate directing optical signals between lens block 103 and corresponding external components (e.g., optical cable). Lens block 103 can be fit onto (e.g., placed flush against) molded package 101. Lens block 103 and molded package 101 can be held together using a variety of attachment mechanisms, such as, for example, epoxy, metal clips, or laser welding. Laser welding can be particularly advantageous when lens block 103 and molded package 101 are made of similar plastic compounds. Lens pins (e.g., lens pins 108 and 106) can be held to lens block 103 using similar mechanisms.

Figure 1B:
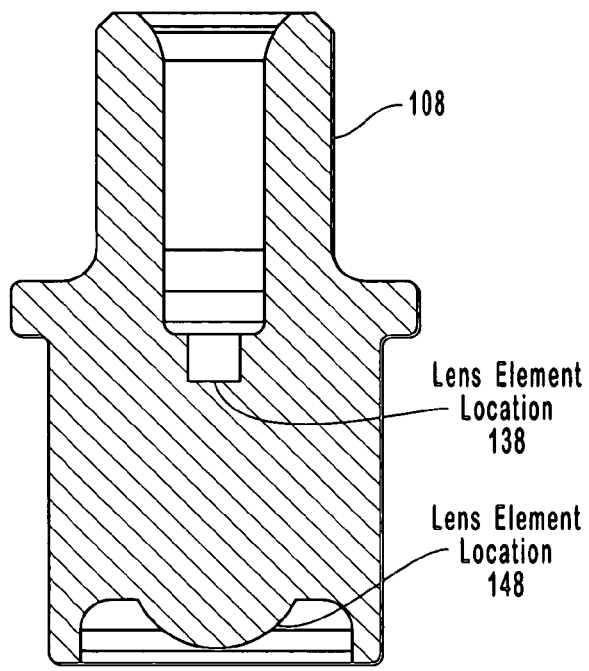
FIG. 1B illustrates a cross sectional view of one of the lens pins of the modular optical device depicted in FIG. 1A.

In some embodiments, lens elements are included at various different locations within a lens pin. For example, FIG. 1B depicts a cross sectional view of lens pin 108 including two different lens element locations 138 and 148. Lens elements can potentially be included at one or more of lens element locations 138 and 148.

Figure 1C:
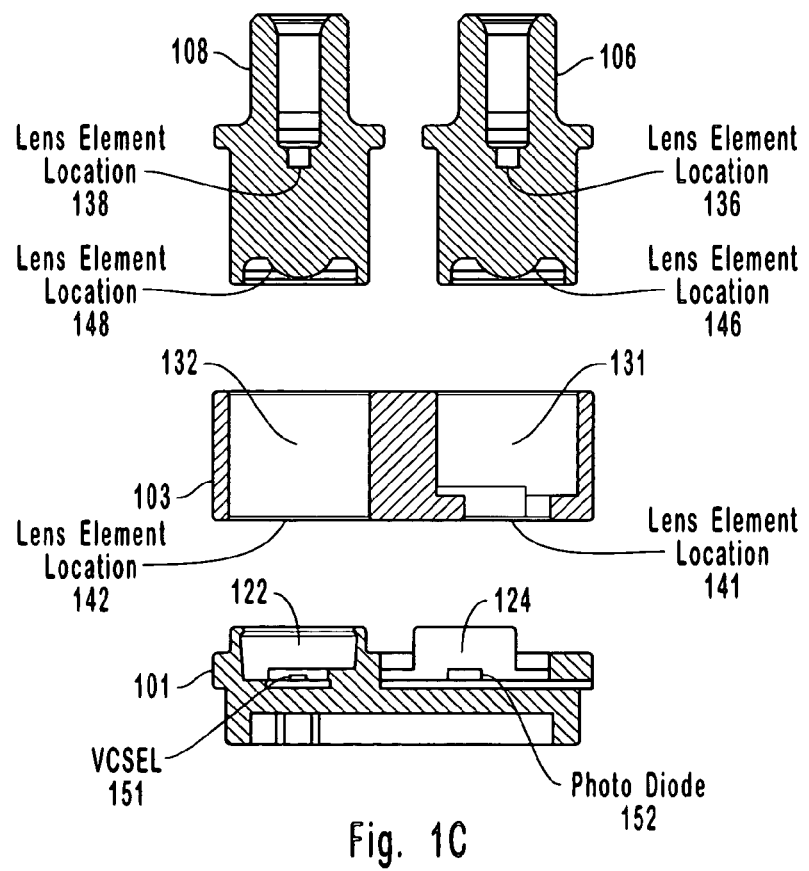
FIG. 1C depicts cross sectional views of components of the modular optical device depicted in FIG. 1A relative to one another.

FIG. 1C depicts cross sectional views of lens pins 106 and 108, lens block 103, and molded package 101 relative to one another. FIG. 1C depicts lens pin 108 including two different lens element locations 138 and 148 as previously described. FIG. 1C also depicts lens pin 106 including two different lens element locations 136 and 146. Similar to lens element locations 138 and 148, lens elements can potentially be included at one or more of lens element locations 136 and 146.

In some embodiments, lens elements are included at various different locations within a lens block. For example, FIG. 1C depicts lens block 103 including two different lens element locations 141 and 142. Lens elements can potentially be included at one or more of lens element locations 141 and 142. In some embodiments, collimating lens elements are included at lens element locations 141 and 142.

Figure 2A:
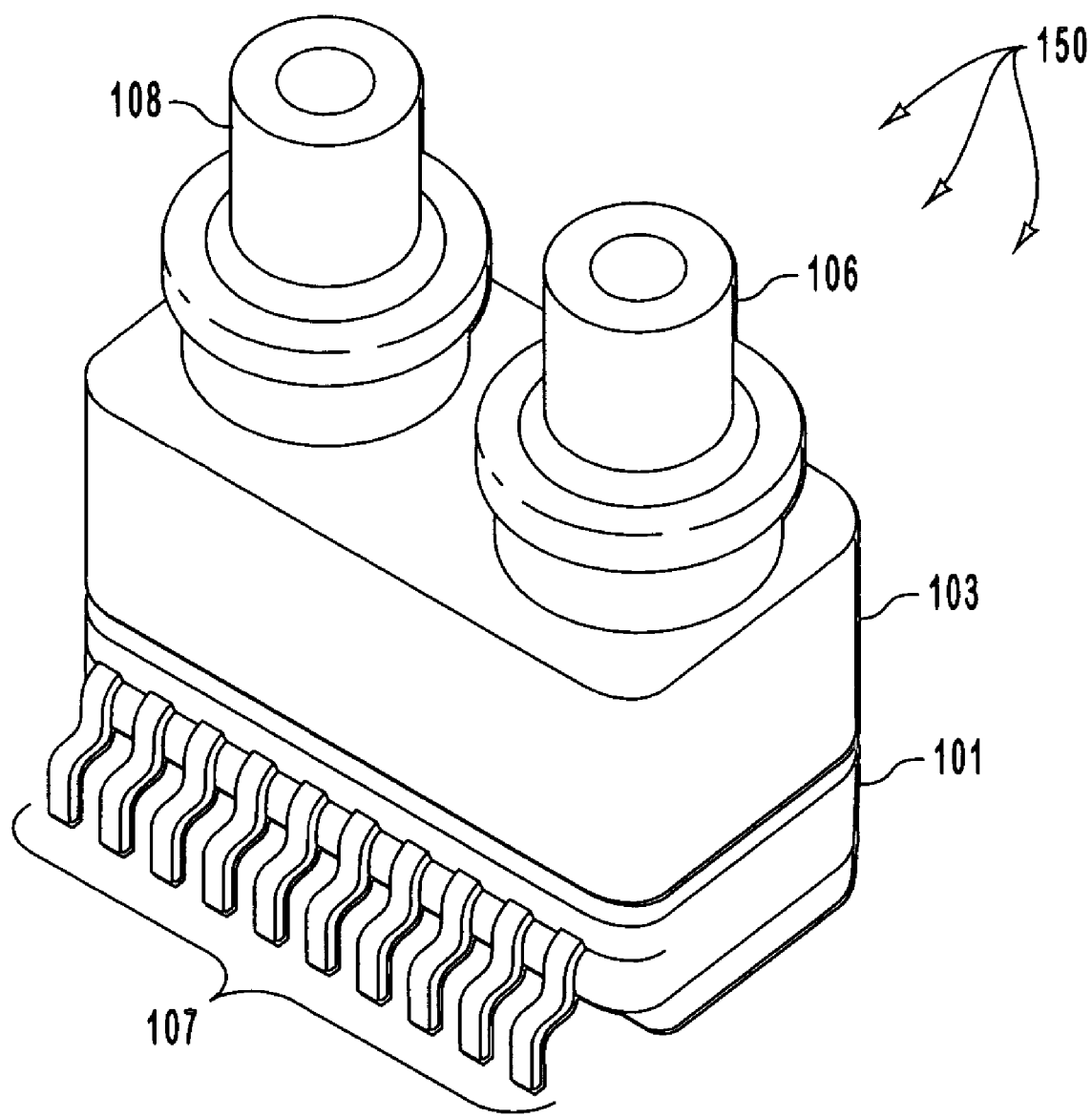
FIG. 2A illustrates an example of an assembled modular optical device package with a formed lead frame.

FIG. 2A illustrates an example of an assembled modular optical device 150 with formed lead frame 107. Modular optical device 150 depicts components from FIG. 1A assembled into a modular optical device. That is, lens pins 106 and 108 are mechanically coupled to lens block 103 and molded package 101 is mechanically coupled to lens block 103.

Figure 2B:
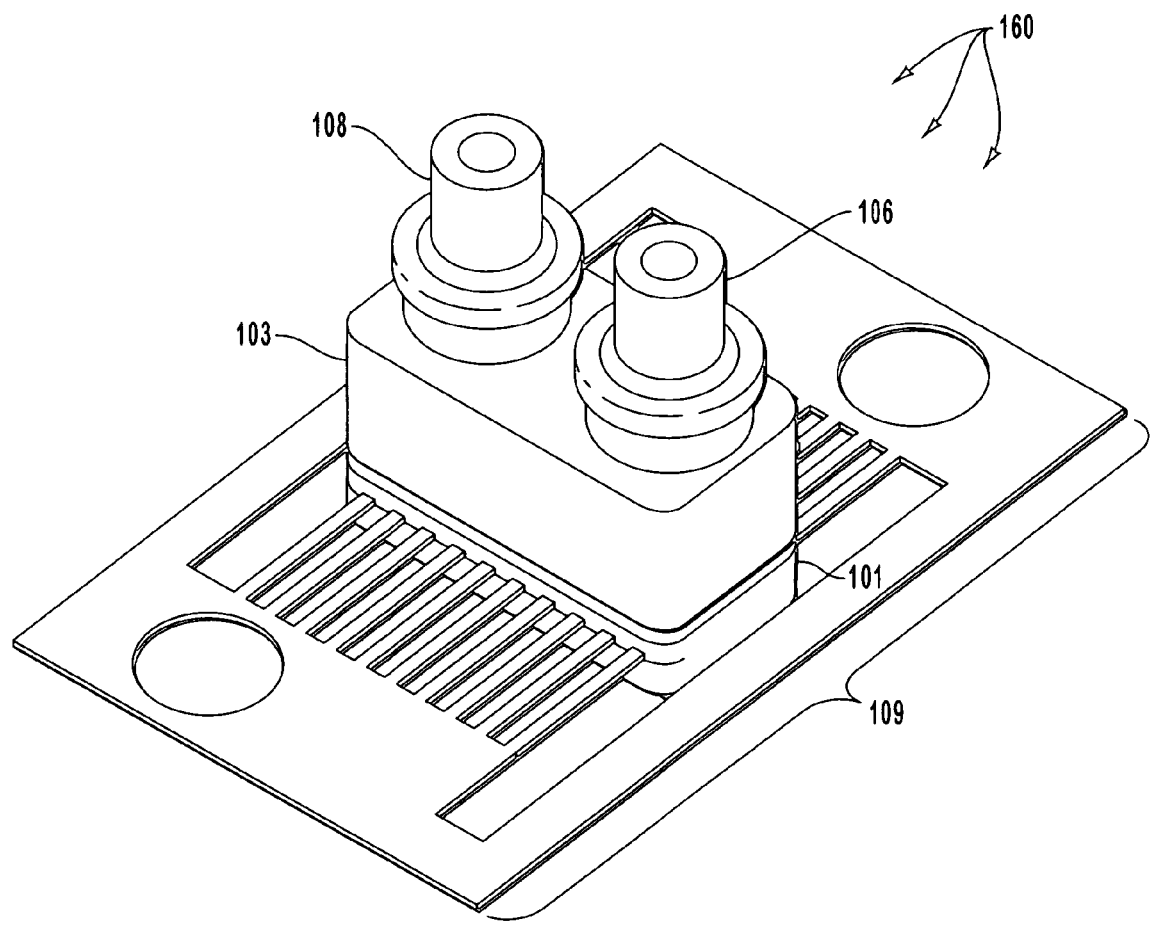
FIG. 2B illustrates an example of an assembled modular optical device package with a flat lead frame.

FIG. 2B illustrates an example of an assembled modular optical device 160 with flat lead frame 109. Modular optical device 160 depicts the components from FIG. 1A assembled into a modular optical device. That is, lens pins 106 and 108 are mechanically coupled to lens block 103 and molded package 101 is mechanically coupled to lens block 103. In FIG. 2B, flat lead frame 109 facilitates electrical connections to other components (e.g., of a HBA).

Referring to FIG. 5, FIG. 5 depicts an assembled modular optical device 550 similar to modular optical device 150. As depicted, modular optical device 550 includes lens pins 506 and 508, lens block 503, and molded package 501. Len pins 506 and 508 include lens elements 536 and 538 respectively. Lens block 503 includes collimating lens elements 543 and 544 for collimating optical signals transferred between molded package 501 and lens pins 506 and/or 508. Molded package 501 includes VCSEL 551 for generating optical signals and photodiode 552 for detecting received optical signals.

Figure 3A:
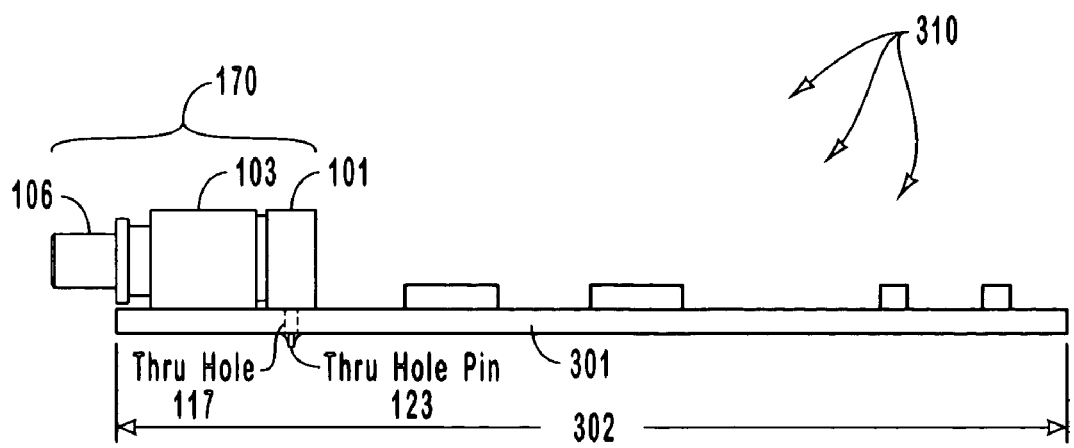
FIG. 3A illustrates an example side view of an assembled modular optical device coupled to a substrate.

Referring back to FIG. 3A, FIG. 3A illustrates an example side view of an assembled modular optical device 170 with a thru hole pin configured lead frame positioned on host bus adapter 310. Modular optical device 170 includes lens block 103, molded package 101, lens pin 106, and lens pin 108 (which from the side view perspective in FIG. 3A is behind lens pin 106 and thus is not visible). Further, modular optical device 170 includes a thru hole pin configured lead frame, which can be an array of electrical pins suitable for connecting to substrate 301.

As depicted in FIG. 3A, a lead frame having a thru hole pin configuration facilitates electrical communication between circuitry (not shown) on substrate 301 (or other components to which modular optical device 170 is mounted) and molded package 101. To secure modular optical device 170 to substrate 301, pins of the thru hole pin configured lead frame (e.g., pin 123 and other pins) can be inserted through thru holes (e.g., thru hole 117 and other thru holes) in substrate 301. Subsequently, thru hole pins can be mechanically and electrically coupled to substrate 301. Pins of a thru hole pin configuration (e.g., pin 123) can be connected to substrate 301 in a variety of ways, including, but not limited to, surface mount connectors, thru hole connectors, and compression-type connectors. Accordingly, a thru hole pin configured lead frame enables data transmission and/or reception, as well as the transmission and reception of control and monitoring signals, between molded package 101 and substrate 301 (or other appropriate components).

Electrical communication can include communication between a light source included in molded package 101, such as, for example, a laser and a corresponding laser driver circuit on substrate 301. Likewise, electrical communication can include communication between a light detector included in molded package 101, such as, for example, a photodiode, and a corresponding transimpedance amplifier circuit on substrate 301. As depicted in FIG. 3A, substrate 301 has length 302.

Figure 3B:
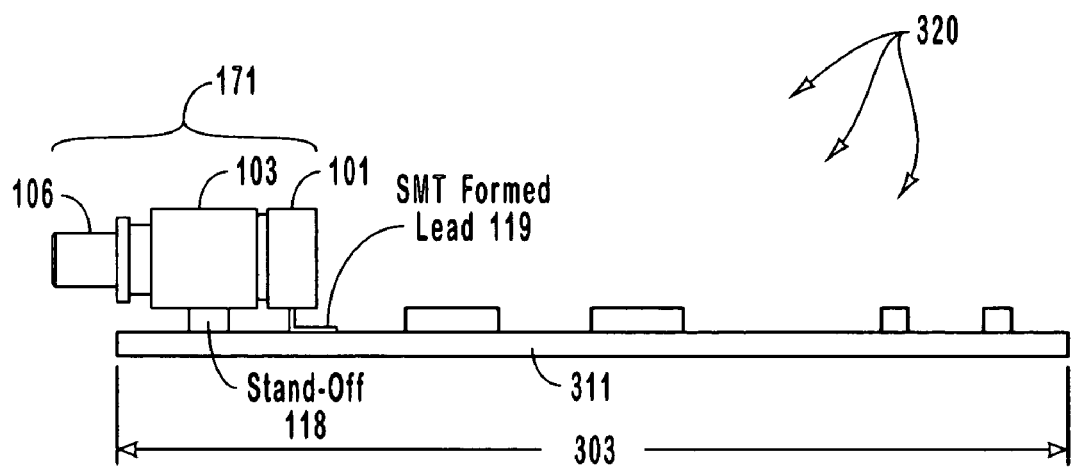
FIG. 3B illustrates an example side view of an alternate configuration of an assembled modular optical device coupled to a substrate.

FIG. 3B illustrates an example side view of an alternate configuration of modular optical device 171 positioned on HBA 320 that facilitates electrical communication between circuitry on substrate 311 (or other components to which modular optical device 171 is mounted) and molded package 101. In the embodiment of FIG. 3B, stand-off 118 is used to mechanically secure optical device 171 to substrate 311. SMT (Surface Mount Technology) formed lead frame 119 electrically connects components of molded package 101 to components of substrate 311. As depicted in FIG. 3B, substrate 311 has length 303 similar to length 302.

Figure 3C:
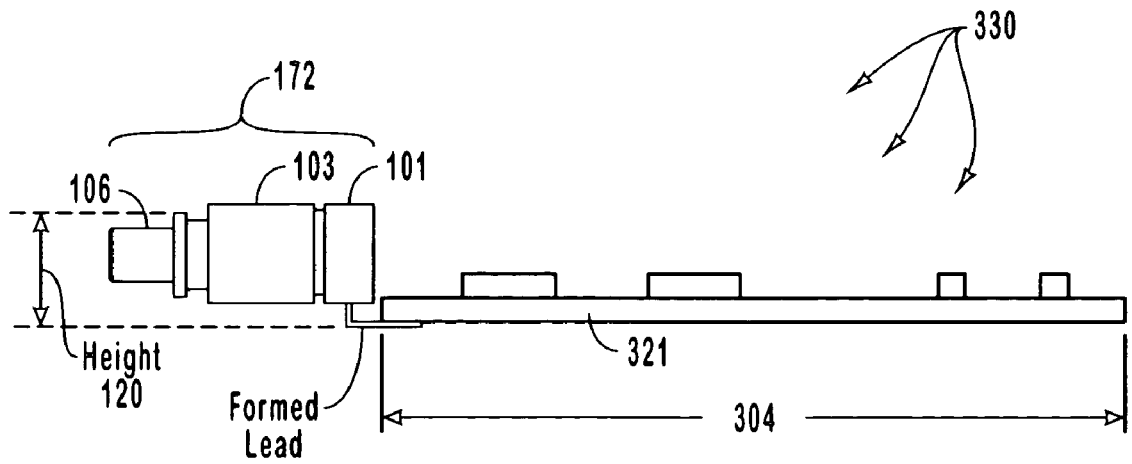
FIG. 3C illustrates an example side view of another alternate configuration of an assembled modular optical device coupled to a substrate.

FIG. 3C illustrates an example side view of another alternate configuration of modular optical device 172 positioned on HBA 330 that facilitates electrical communication between circuitry on a substrate 321 (or other components to which modular optical device 172 is mounted) and molded package 101. Formed lead frame 121 mechanically and electrically couples optical device 172 to substrate 321. The configuration of formed lead frame 121 along with the mounting point being on the underside of substrate 321, results in height 120 being reduced as compare to other configurations (e.g., those in FIGS. 3A and 3B). Further as depicted in FIG. 3C, length 304 is substantially reduced compared to lengths 302 and 303.

Figure 3D:
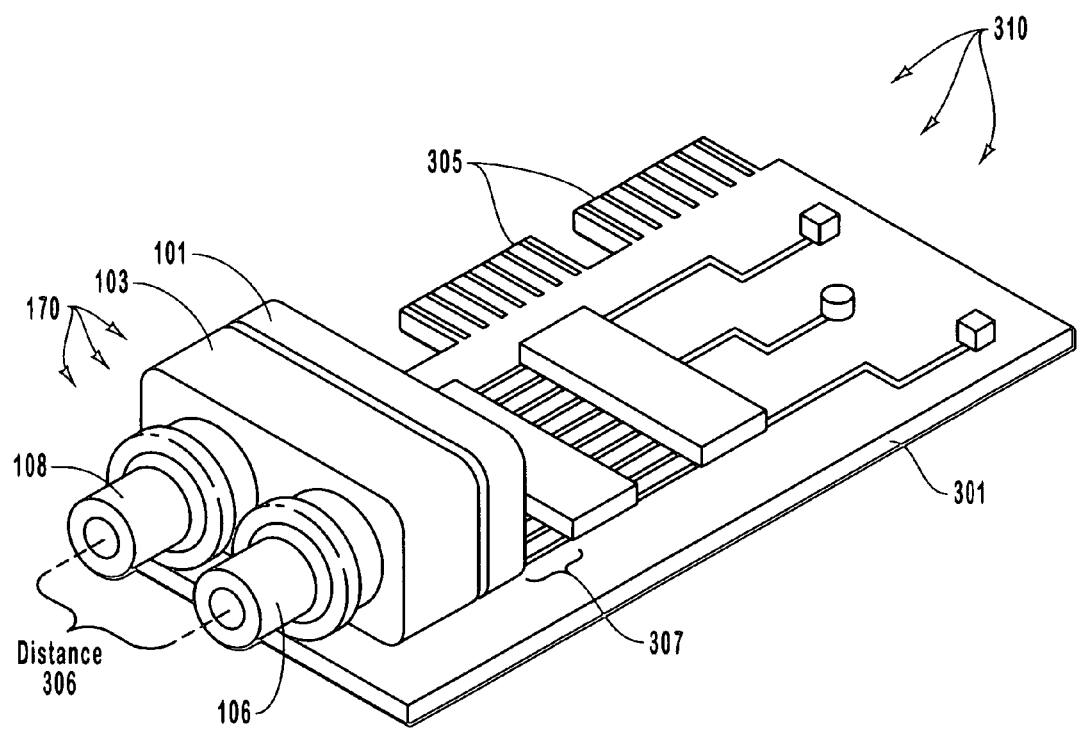
FIG. 3D illustrates an example perspective view of the assembled modular optical device having a thru hole pin configured lead frame positioned on a host bus adapter.

FIG. 3D illustrates an example perspective view of the modular optical device 170 having a thru hole pin configured lead frame (the configuration of FIG. 3A) positioned on host bus adapter 310. As depicted in FIG. 3D, substrate 301 includes an edge connector 305 suitable for connecting substrate 301 with a corresponding receptacle in a computer system, for example, to establish a mechanical and electrical interface between substrate 301 and computer system bus. Alternately, edge connector 305 can facilitate establishment of a mechanical and electrical interface between modular optical device 170 and a variety of other devices, such as, for example, an optical router or optical hub. A thru hole pin configured lead frame can include pins for contacting each of the circuit traces 307.

Components (now shown), such as, for example, light emitting diodes, a laser driver, a post amplifier, a transimpedance amplifier, a current bias driver, volatile and/or non-volatile memory, and a thermoelectric cooler ("TEC") can be implemented on substrate 301. Components can be implemented on either side of substrate 301 as appropriate. Implemented components can interface electrically with modular optical device 170 through pins of the thru hole pin configured lead frame (e.g., thru hole pin 123). Likewise, when substrate 301 is coupled to a computer system or other device, such implemented components can interface electrically with the computer system or other device. Mounting components, circuits and devices on both sides of substrate 301 can facilitate a compact structure without any meaningful loss in functionality. Moreover, as previously described, this aids space conservation on an HBA or other device to which the modular optical device 170 is mounted.

Similar connections can be made for formed lead frame configurations (e.g., the configurations in FIGS. 3B and 3C). Accordingly, modular optical devices can be manufactured in a configuration that facilitates direct coupling to an external substrate (e.g., a PCBA), without further (and potentially manual) processing of the pins or lead frame.

Further, including circuitry for interoperating with light sources and light detectors on substrate 301 (or other appropriate medium) reduces the circuitry that is to be included in molded package 101. Accordingly, the number and size of components included in molded package 101 is reduced resulting in a cheaper, more compact optical device. Additionally, the reduced size allows for production of relatively shorter transceivers that can be readily integrated within various devices.

Modular optical device 170 can be arranged such that distance 306 is large enough that a first optical connector can be connected to lens pin 106, while a second optical connector is simultaneously connected to lens pin 108 and vice versa. Generally, lens pins 106 and 108 can be configured to receive any of a variety of connectors, such as, for example, SC, LC, ST, and FC connectors. Other configurations of modular optical devices can be configured as appropriate to simultaneously connect to a number of optical connectors.

Figure 3E:
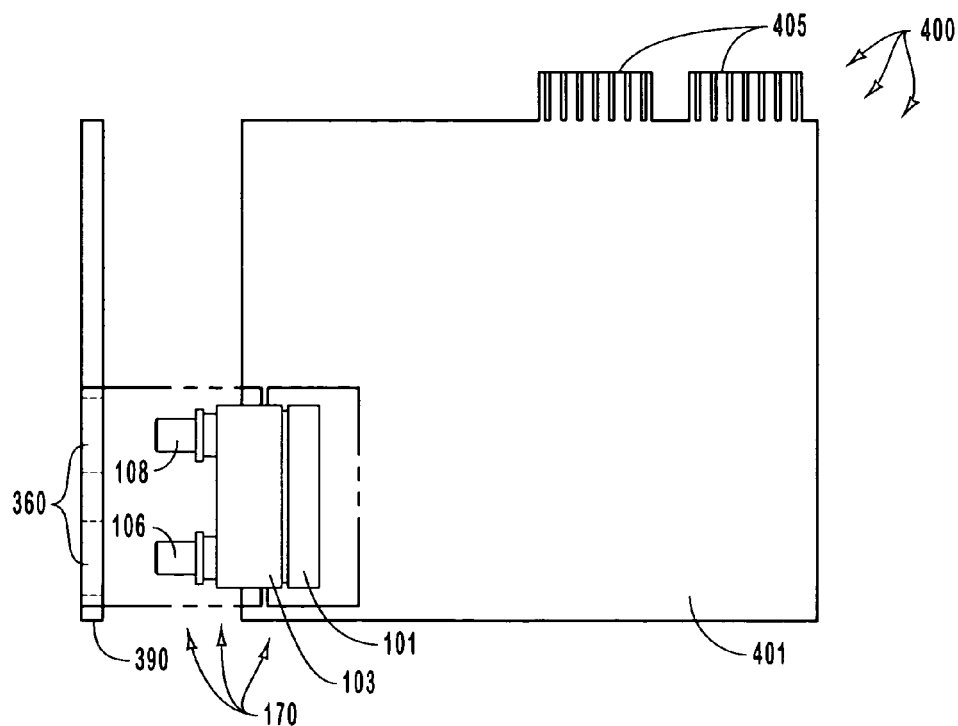
FIG. 3E illustrates an example of a top view of the assembled modular optical device having a thru hole pin configured lead frame positioned on a host bus adapter, and illustrating the arrangement of a face plate of a host device relative to the assembled modular optical device.

FIG. 3E illustrates an example of a top view of the modular optical device 170 positioned on a host bus adapter 400, and illustrating the arrangement of a face plate 390 of a host device relative to the modular optical device 170. As previously described, embodiments of the present invention include a thru hole pin configured lead frame for implementing a mechanical and electrical interface between a modular optical device and a substrate. Such a connection can be used to mechanically and electrically interface between modular optical device 170 and substrate 401 that, for example, includes edge connector 405 or other suitable connector for interfacing with a card, connector, or system.

Generally, the HBA 400 can be any type of printed circuit board implemented as a suitable connector interface for use with a computer system, wherein the connector interface may take the form of, for example, a peripheral component interconnect ("PCI") card having edge connectors 405 configured and arranged to interface with a desktop computer system. The connector interface may alternatively take the form of, for example, a printed circuit board with a serial or parallel port, or a Personal Computer Memory Card International Association ("PCMCIA") standard card. Note that as used herein, "connector interface" generally refers to a PCB or other device that acts as an interface between an optical component, such as the modular optical device 170, and a host system such as a laptop computer, desktop computer, or portable computing systems such as personal digital assistants ("PDA").

FIG. 3E depicts the arrangement of modular optical device 170 and substrate 401 (collectively HBA 400) relative to a face plate 390. Face plate 390 facilitates securing the optical transceiver HBA 400 (and thus modular optical device 170) in a host device (not shown). The face plate 390 additionally includes suitable cutouts 360 allowing the connection of optical cables, for example, to the lens pins 106 and 108. The face plate 390 may be attached to the modular optical device 170 and/or substrate 401 or, alternatively, may be an element of the host device.

Turning now to FIG. 4A, FIG. 4A illustrates a rear view of a desktop computer system 405 having a host bus adapter that includes the modular optical device. Desktop computer system 405 has a component interface panel 410 that includes connection interfaces for peripheral devices such as a monitor, a mouse, a keyboard, USB devices, and other components. The exemplary desktop computer system 405 also includes network connection interfaces 420 such as connection interfaces for an Ethernet cable, and/or a telephone cable.

Depicted in FIG. 4A, the modular optical device 170 is employed in the desktop computer system 405 with connections to substrate 401 (not shown) such as, for example, a PCI card. Thus, the desktop computer system 405 can implement a fiber optic connection interface in a similar position as the other network connections 420. Moreover, the relatively small size of modular optical device 170 facilitated by the use of the substrate 401, enables the modular optical device 170 to be integrated within the desktop computer system 405, thereby obviating the need for additional external connectors and devices. Accordingly, a user is able to simply plug a fiber optic cable 452 directly into the desktop computer system 405 (e.g., into lens pins 106 and 108 respectively).

As previously described, modular optical device 170, substrate 401, or desktop computer system 405 includes a face plate 390. Further, status indicator components 390B, such as LEDs for example, and other devices are mounted in face plate 390 so as to be perceptible by a user.

FIG. 4B is a side view of a laptop computer system 450 having a host bus adapter that includes the modular optical device 170. In this embodiment, the modular optical device 170 and substrate 401 (collectively HBA 400) are configured to slide into an available port of the laptop computer system 450, wherein such ports include, among others, PCMCIA ports. The fiber optic cable 451 can then be inserted directly into the laptop computer system 450 (e.g., into lens pins 106 and 108 respectively).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A modular optical device comprising:
   a lens block configured such that one or more lens pins can mechanically couple to the lens block and such that the lens block can mechanically couple to a molded package;
   a molded package mechanically coupled to the lens block, the molded package including at least one of a light source and a light detector, the molded package including a connection portion configured for direct electrical coupling to an external substrate; and
   at least one lens pin mechanically coupled to the lens block, the at least one lens pin for directing an optical signal between the at least one of a light source and a light detector and at least one corresponding external component, the at least one lens pin being substantially axially aligned with the at least one of the light source and the light detector such that the optical signal can travel in a generally straight line between the external component and the at least one of the light source and the light detector.

2. The modular optical device as recited in claim 1, wherein the molded package includes a laser.

3. The modular optical device as recited in claim 1, wherein the molded package includes a photodiode.

4. The modular optical device as recited in claim 1, wherein the molded package includes a lead frame for connecting to a substrate.

5. The modular optical device as recited in claim 1, wherein the molded package includes pins for connecting to thru hole pin configuration of a substrate.

6. The modular optical device as recited in claim 1, wherein the molded package is a plastic molded package.

7. The modular optical device as recited in claim 1, wherein the at least one lens pin mechanically coupled to the lens block is configured to direct an optical signal between the at least one of a light source and a light detector and at least one corresponding optical cable.

8. The modular optical device as recited in claim 1, further comprising an attachment portion that mechanically couples the lens block to the molded package, the attachment portion being selected from among epoxy, metal clips, and a laser weld.

9. The modular optical device as recited in claim 1, wherein the lens block includes a collimating lens element for collimating an optical signal transferred between the at least one of a light source and a light detector and at least one corresponding external component.

10. The modular optical device as recited in claim 1, wherein the at least one lens pin includes a lens element.

11. An optoelectronic interface device comprising:
    a host bus adapter having a printed circuit board with at least one connector for electrically interfacing with a host device; and a modular optical device configured to mechanically and electrically interface with the host bus adapter, the modular optical device comprising:

a lens block including one or more integrated lenses, the lens block configured such that one or more lens pins can mechanically couple to the lens block and such that the lens block can mechanically couple to a molded package;

a molded package mechanically coupled to the lens block, the molded package manufactured to include at least one of a light source and a light detector and manufactured to include a formed external connection portion for electrically coupling the molded package to the host bus adapter without further processing of the formed external connection portion; and at least one lens pin mechanically coupled to the lens block, the at least one lens pin for transferring an optical signal between the at least one of a light source and a light detector and an external component, the at least one lens pin being substantially axially aligned with the at least one of the light source and the light detector such that the optical signal can travel in a generally straight line between the external component and the at least one of the light source and the light detector.

12. The optoelectronic interface device as recited in claim 11, wherein the host bus adapter includes components for converting between an optical signal and an electrical signal.

13. The optoelectronic interface device as recited in claim 12, wherein the host bus adapter includes a laser driver.

14. The optoelectronic interface device as recited in claim 12, wherein the host bus adapter includes a transimpedance amplifier.

15. The optoelectronic interface device as recited in claim 11, wherein the optoelectronic interface device is configured to be substantially received within a standard slot of the host device.

16. The optoelectronic interface device as recited in claim 15, wherein the standard slot comprises one of: a PCI card slot and a PCMCIA card slot.

17. The optoelectronic interface device as recited in claim 11, wherein the host bus adapter comprises a printed circuit board for one of: a peripheral component interconnect card and a PCMCIA card.

18. The optoelectronic interface device as recited in claim 11, further comprising:

a face plate defining cutouts and being attached, at least indirectly, to at least one of: the modular optical device and the host bus adapter.

19. The optoelectronic interface device as recited in claim 18, wherein the faceplate includes at least one status indicator.

20. A modular optical device comprising:

a lens block configured such that a plurality of lens pins can mechanically couple to the lens block and such that the lens block can mechanically couple to a molded package;

a molded package mechanically coupled to the lens block, the molded package including a laser and a photodiode, the molded package including a connector configured to facilitate direct electrical and mechanical coupling of the molded package to a substrate such that the modular optical transceiver can interface with circuitry on the substrate;

a first lens pin mechanically coupled to the lens block for directing a first optical signal from the laser to an external component, the first lens pin being substantially axially aligned with the laser such that the first optical signal can travel in a generally straight line between the laser and the external component; and a second lens pin mechanically coupled to the lens block for directing a second optical signal from an external component to the photodiode, the second lens pin being substantially axially aligned with the photodiode such that the second optical signal can travel in a generally straight line between the external component and the photodiode.

21. The modular optical device recited in claim 20, wherein the molded package is a plastic molded package.

22. The modular optical device recited in claim 20, wherein the connector includes a lead frame that was manufactured for direct coupling to the substrate without requiring further processing.

23. The modular optical device recited in claim 20, wherein the connector includes one or more pins for connecting to a thru hole pin configuration of the substrate, the pins manufactured for direct coupling to the substrate without requiring further processing.

* * * * *